United States Patent [19]

McCormick et al.

[11] Patent Number: 5,535,856
[45] Date of Patent: Jul. 16, 1996

[54] ANTIVIBRATION CLIP WHICH BIASES FRICTION PAD AND CALIPER IN SAME DIRECTION

[75] Inventors: Christopher O. McCormick, Plymouth; James V. Bergman, Romulus, both of Mich.

[73] Assignee: Kelsey-Hayes Company, Romulus, Mich.

[21] Appl. No.: 275,894

[22] Filed: Jul. 15, 1994

[51] Int. Cl.⁶ .................................................. F16D 65/00
[52] U.S. Cl. ................................... 188/73.36; 188/205 A
[58] Field of Search .......................... 188/73.35, 73.36, 188/73.37, 73.38, 206 R, 205 A, 72.3

[56] References Cited

U.S. PATENT DOCUMENTS

| | | | |
|---|---|---|---|
| 3,612,226 | 10/1971 | Pauwels et al. | 188/73.36 X |
| 4,134,477 | 1/1979 | Asquith | 188/73.3 |
| 4,136,761 | 1/1979 | Burgdorf et al. | 188/73.36 X |
| 4,194,597 | 3/1980 | Evans et al. | 188/73.38 |
| 4,793,448 | 12/1988 | Bolenbaugh et al. | 188/73.35 X |
| 4,823,920 | 4/1989 | Evans | 188/73.36 X |
| 5,273,137 | 12/1993 | Taig | 188/73.35 |

FOREIGN PATENT DOCUMENTS 3614786  11/1986  Germany ............................. 188/73.36

OTHER PUBLICATIONS

Engineering Drawing D–10764, dated 1982.
Drawing Labeled D–12514101–B, dated Apr. 9, 1990.
Drawing Labeled F2UA–3B3Ø6–BE, dated Aug. 27, 1990.

*Primary Examiner*—Josie Ballato
*Attorney, Agent, or Firm*—MacMillan, Sobanski & Todd

[57] ABSTRACT

A vehicle disc brake caliper assembly which includes an improved structure for supporting a caliper relative to an associated anchor plate. The disc brake caliper assembly includes an anchor plate including first and second spaced apart guide rails, and a caliper slidably supported on pins secured to the anchor plate. A pair of friction pads are carried by the guide rails and are adapted to be disposed on opposite axial sides of an associated rotor. The friction pads define a pair of notched first ends and a pair of notched second ends. An actuator is carried by the caliper for selectively moving the friction pads into frictional engagement with the rotor. The caliper is provided with a lift stop which is located above each of the guide rails and which functions to provide additional support for the caliper relative to the anchor plate. A separate clip is supported on each of the guide rails and receives the associated caliper lift stop to prevent rattling of the caliper lift stop against the associated guide rail. The clip also receives and prevents rattling of the adjacent notched ends of the friction pads.

20 Claims, 7 Drawing Sheets

ANTIVIBRATION CLIP WHICH BIASES FRICTION PAD AND CALIPER IN SAME DIRECTION

BACKGROUND OF THE INVENTION

This invention relates in general to vehicle disc brake assemblies and in particular to an improved structure for supporting the vehicle disc brake assembly.

Virtually all wheeled vehicles are provided with a brake system for selectively inhibiting the rotation of the wheels and, therefore, slowing the movement of the vehicle. To accomplish this, a typical vehicle brake system includes a friction brake assembly which is provided at one or more of the vehicle wheels. Upon actuation by a driver of the vehicle through manual movement of a brake pedal and an associated hydraulic actuating system, the friction brake assemblies are effective to inhibit the rotation of the associated vehicle wheels.

One type of friction brake assembly in common use is a disc brake assembly. In a disc brake assembly, a rotor or disc is secured to the wheel of the vehicle for rotation therewith. A caliper assembly is slidably supported by pins secured to an anchor plate. The anchor plate is secured to a non-rotatable component of the vehicle, such as the vehicle frame. The caliper assembly includes a pair of friction pads which are disposed on opposite sides of the rotor. The friction pads are operatively connected to one or more hydraulically actuated pistons. When the driver of the vehicle manually moves the brake pedal, the friction pads are moved toward one another into frictional engagement with the rotor. As a result of this frictional engagement, rotation of the rotor and its associated wheel are inhibited.

When the disc brake assembly is not actuated, the friction pads are normally spaced apart from the opposite sides of the rotor. Because they are not positively engaged with the rotor, the friction pads can move when the vehicle is operated. Such vibrations can result in an undesirable rattling or other noise. To prevent this from occurring, it is known to provide an anti-rattle clip in the disc brake assembly. The anti-rattle clip is typically embodied as a spring metal member having leg portions which are compressed between each of the friction pads and a non-moving component of the disc brake assembly. The anti-rattle clip exerts a relatively small force against the associated friction pad which prevents it from rattling when the disc brake assembly is disengaged. A number of anti-rattle clip structures are known in the art for use with the friction pads of disc brake assemblies. It has also been found that the caliper of the disc brake assembly can rattle when the vehicle is operated, resulting in undesirable noise. Thus, it is also known to provide a similar anti-rattle clip for exerting a relatively small force against the caliper to prevent it from rattling when the disc brake assembly is disengaged. Usually, separate anti-rattle clips are provided for the friction pads and for the caliper. However, it is known to provide a single anti-rattle clip for exerting forces against both the friction pads and the caliper.

Also, in some disc brake designs, the weight and size of the caliper may cause the caliper to droop or sag relative to the anchor plate.

SUMMARY OF THE INVENTION

This invention relates to a vehicle disc brake caliper assembly which includes an improved structure for supporting a caliper relative to an associated anchor plate. The disc brake caliper assembly includes an anchor plate including first and second spaced apart guide rails, and a caliper slidably supported on pins secured to the anchor plate. A pair of friction pads are carried by the guide rails and are adapted to be disposed on opposite axial sides of an associated rotor. The friction pads define a pair of notched first ends and a pair of notched second ends. An actuation means is carried by the caliper for selectively moving the friction pads into frictional engagement with the rotor.

In accordance with the present invention, the caliper is provided with at least one lift stop which is located above one of the guide rails and which functions to provide additional support for the caliper relative to the anchor plate. Preferably, a clip is supported on this one guide rail and receives the associated caliper lift stop to prevent rattling of the caliper lift stop against this guide rail. In addition, this same clip can be adapted to receive and prevent rattling of the adjacent notched ends of the friction pads. In the preferred embodiment, each end of the caliper is provided with a separate lift stop, and a separate clip is provided on each guide rail for retaining the adjacent caliper lift stop and the notched ends of the friction pads.

Various objects and advantages of this invention will become apparent to those skilled in the art from the following detailed description of the preferred embodiment, when read in light of the accompanying drawings.

DESCRIPTION OF THE PREFERRED EMBODIMENT

Figure 1:
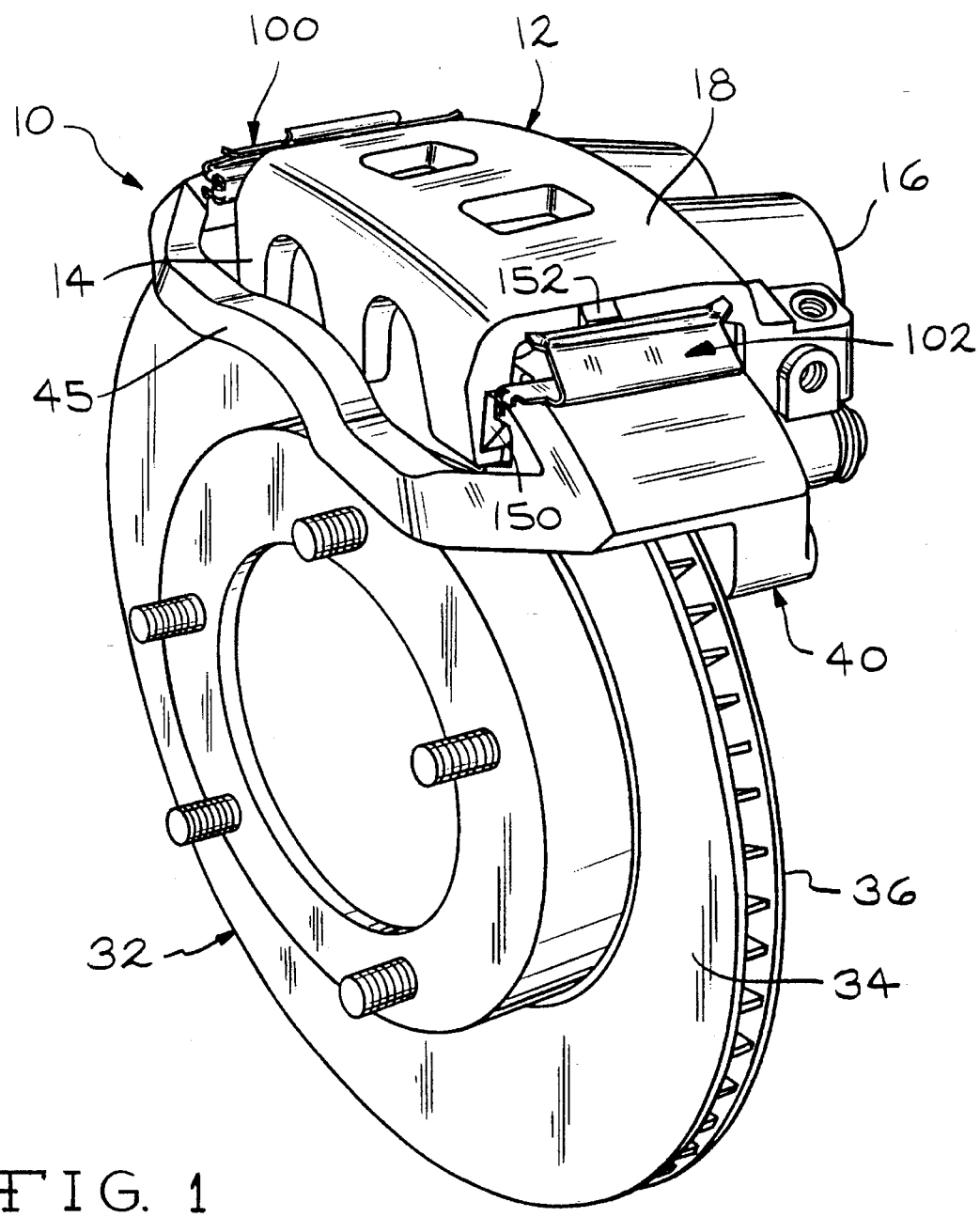
FIG. 1 is a perspective view of a vehicle disc brake assembly in accordance with this invention.

Referring now to the drawings, there is illustrated in FIG. 1 a vehicle disc brake assembly, indicated generally at 10. It should be noted that while the invention is described for use with the particular disc brake structure shown in the drawings, the invention can be used with other disc brake structures. The disc brake assembly 10 includes a generally C-shaped caliper 12 which is slidably supported on pins 13 (see FIG. 2) secured to an anchor plate 40. The anchor plate 40 is secured to a fixed component of the vehicle, such as the frame thereof (not shown).

Figure 3:
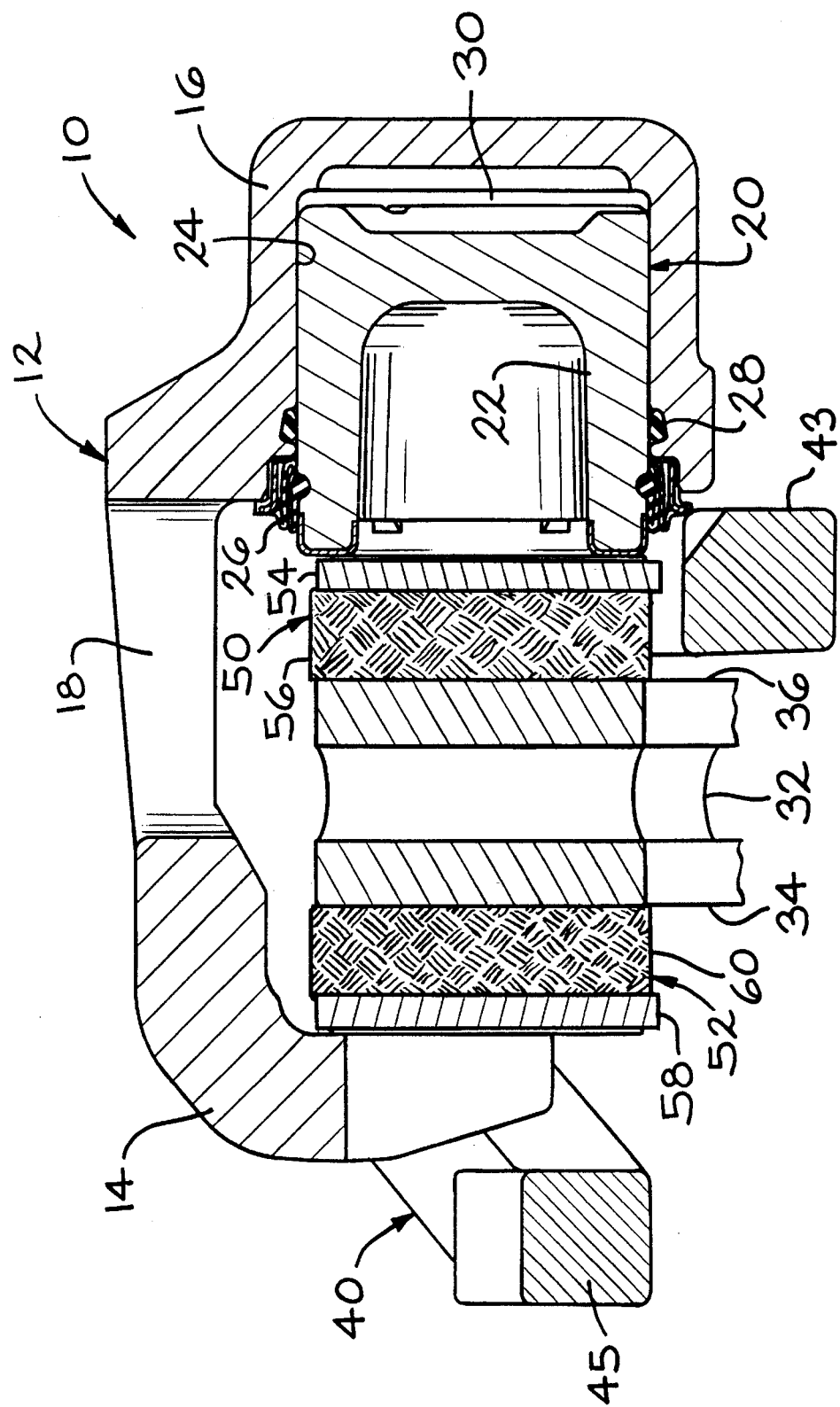
FIG. 3 is a sectional elevation view of a portion of the disc brake assembly illustrated in FIG. 2.

The caliper 12 includes an outboard leg 14 and an inboard leg 16 which are interconnected by a bridge portion 18. The inboard caliper leg 16 contains an actuation means, indicated generally at 20 in FIG. 3. The actuation means 20, shown in this embodiment as being a hydraulic actuation means, is operable to reciprocally move a pair of brake pistons 22 (only one piston 22 is shown) within a pair of bores 24 formed in the inboard caliper leg 16. However, other types of actuation means, such as for example, electrical and mechanical types, can be used.

The disc brake assembly 10 further includes a dust boot seal 26 and an annular fluid seal 28. The dust boot seal 26 is intended to keep out most of the elements of weather, i.e., salt, water, and mud. The annular seal 28 is designed to provide a sealed chamber 30 into which hydraulic fluid may be introduced under pressure so as to actuate the associated piston 22 in an outboard direction toward a brake rotor 32. The brake rotor 32 includes a pair of braking surfaces or faces 34 and 36.

Figure 2:
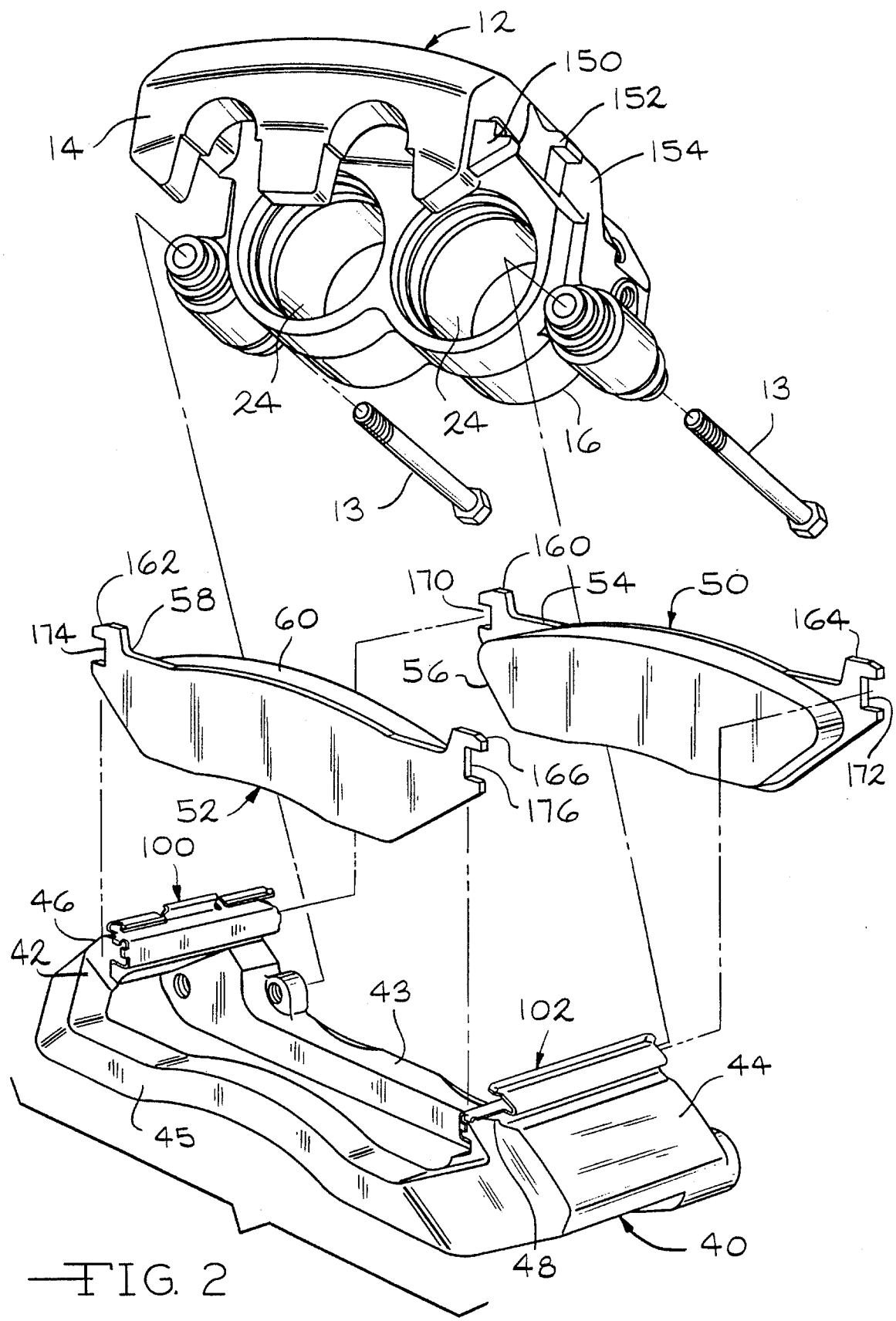
FIG. 2 is an exploded perspective view of selected components of the disc brake assembly illustrated in FIG. 1.
Figure 4:
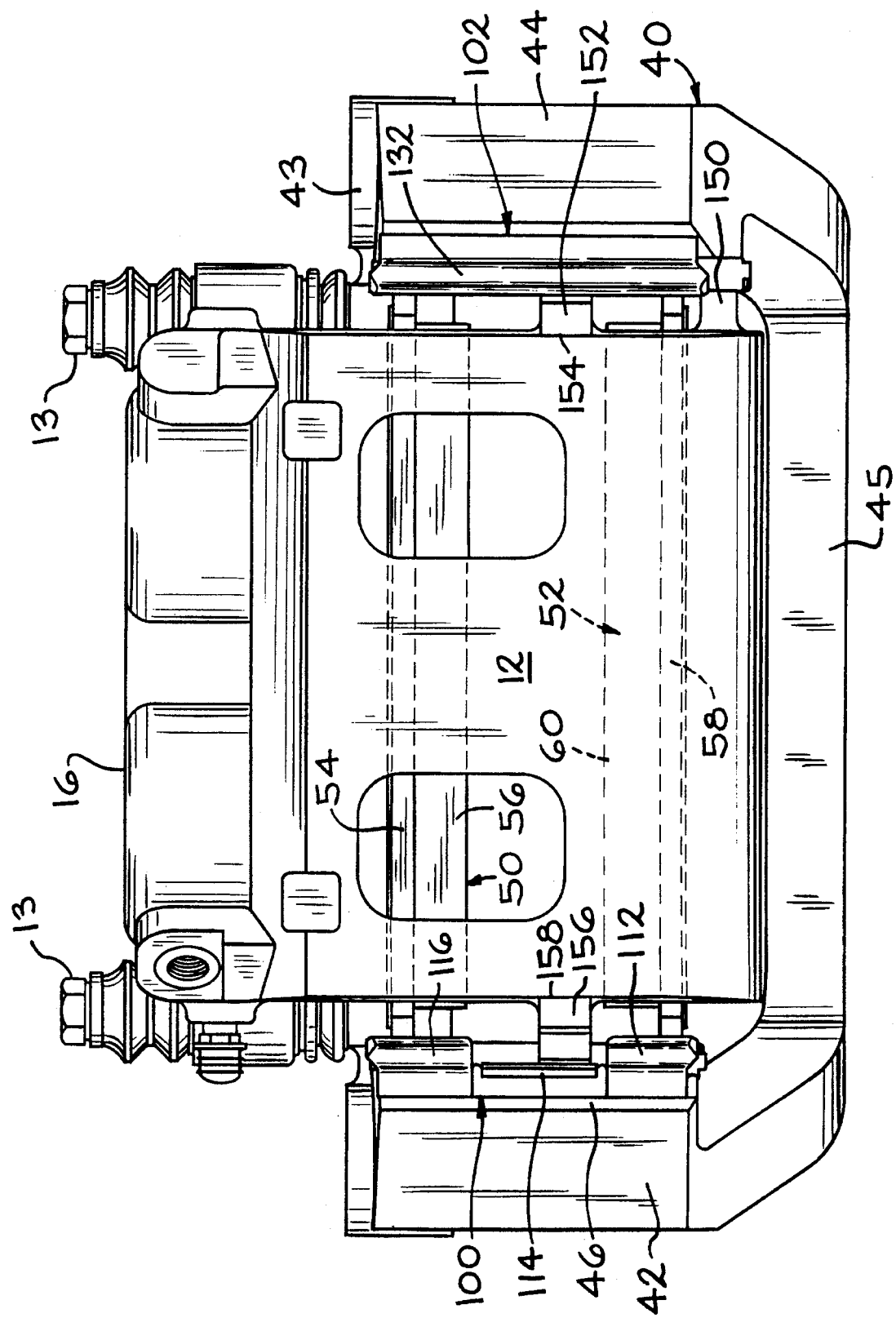
FIG. 4 is a top plan view of the disc brake assembly illustrated in FIG. 3.
Figure 5:
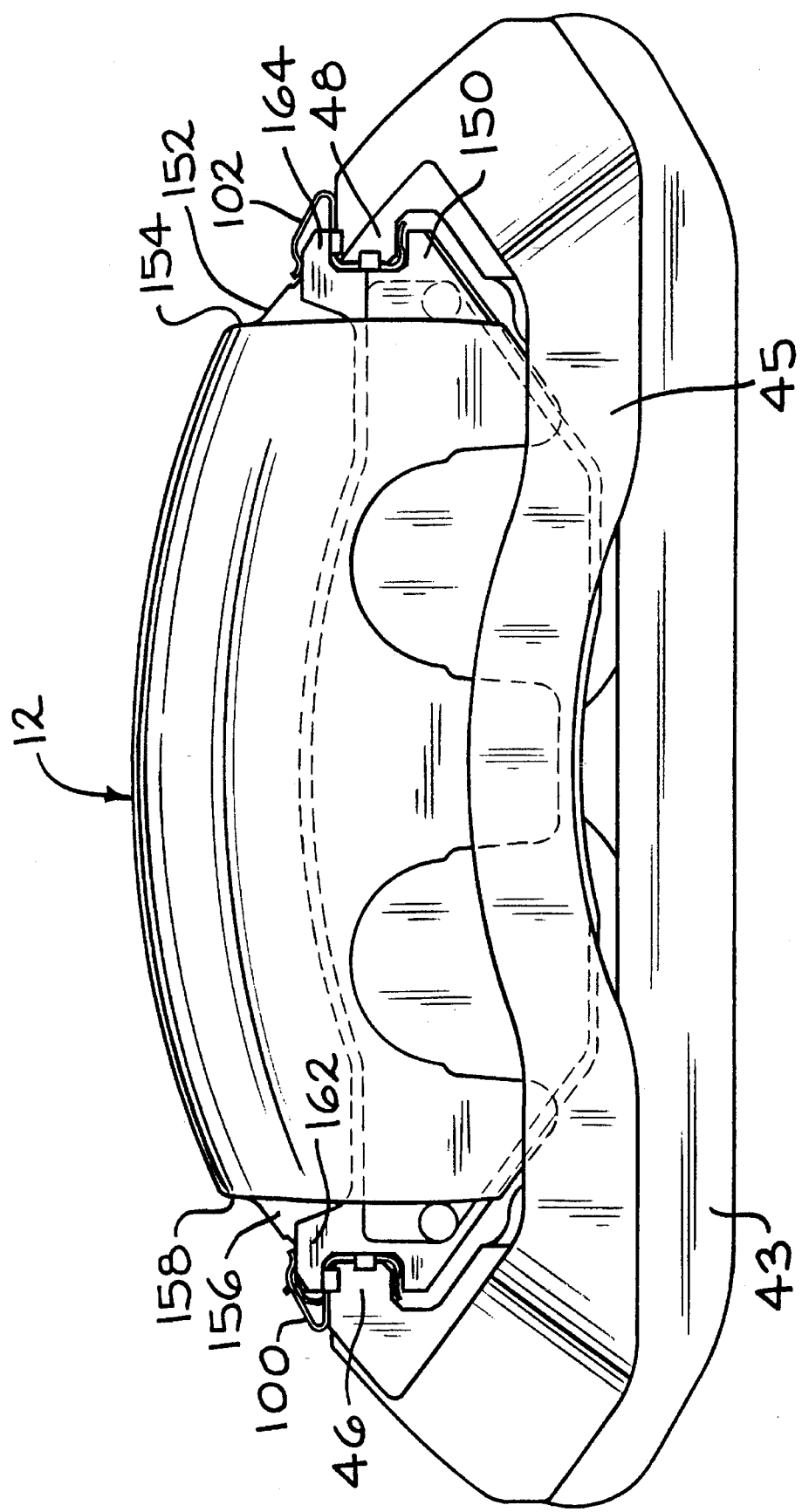
FIG. 5 is a front view of the disc brake assembly, and showing the disc brake assembly in its fully assembly condition.

As best shown in FIGS. 2 and 4, the anchor plate 40 includes a pair of axially and outwardly extending arms 42 and 44, an inner tie bar 43, and an outer tie bar 45. The arm 42 includes a guide rail 46, and the arm 44 includes a guide rail 48. The guide rails 46 and 48 slidably support an inboard friction pad 50 and an outboard friction pad 52, respectively, of the disc brake assembly 10.

The inboard friction pad 50 includes a backing plate 54 and a friction pad 56. The backing plate 54 includes opposed ends 160 and 164 having notches 170 and 172, respectively, for supporting the friction pad 50 on the guide rails 46 and 48 of the anchor plate 40. The outboard friction pad 52 includes a backing plate 58 and a friction pad 60. The backing plate 58 includes opposed ends 162 and 166 having notches 174 and 176, respectively, for supporting the friction pad 52 on the guide rails 46 and 48 of the anchor plate 40.

When hydraulic fluid is introduced into the chambers 30, the pistons 22 are caused to slide within the bores 24 to engage the backing plate 54 of the inboard friction pad 50. At the same time, the caliper 12 slides on the pins 13 so that the outboard leg 14 of the caliper 12 engages the backing plate 58 of the outboard friction pad 52. Thus, when hydraulic fluid is forced into the chambers 30, the friction pads 56 and 60 are operatively moved toward one another into frictional engagement with the oppositely facing surfaces 34 and 36 of the rotor 32 to cause braking thereof. The construction of the disc brake assembly 10 thus far described is conventional in the art.

Figure 9:
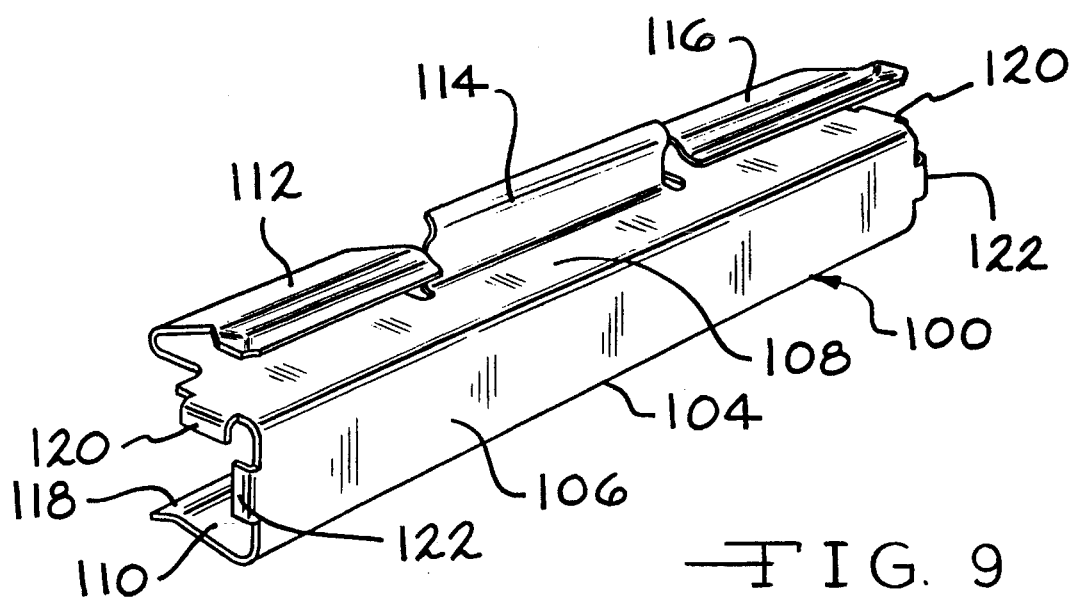
FIG. 9 is a perspective view of a clip of the disc brake assembly.

In accordance with the present invention, the specific construction of clips or springs 100 and 102, and the caliper 12 of the present invention will be discussed. The clips 100 and 102 are preferably constructed from metal, such as steel, and are formed by a stamping operation. As best shown in FIG. 9, the clip 100 includes a generally U-shaped main body portion 104 which defines a side wall 106, an upper wall 108, and a lower wall 110. The upper wall 108 includes three spring arms 112, 114 and 116 extending therefrom. The spring arms 112 and 116 are reversely bent back and extend toward the side wall 106, and the spring arm 114 extends generally upwardly from the upper wall 108. The lower wall 110 is provided with a reversely bent back end 118.

The clip 100 further includes a pair of tabs 120 extending downwardly from opposed ends of the upper wall 108, and a pair of tabs 122 extending outwardly from opposed ends of the side wall 106. As will be discussed, the tabs 120 and 122 and the bent back end 118 of the lower wall 110 function to positively secure the clip 100 on the guide rail 46 of the anchor plate 40.

Figure 10:
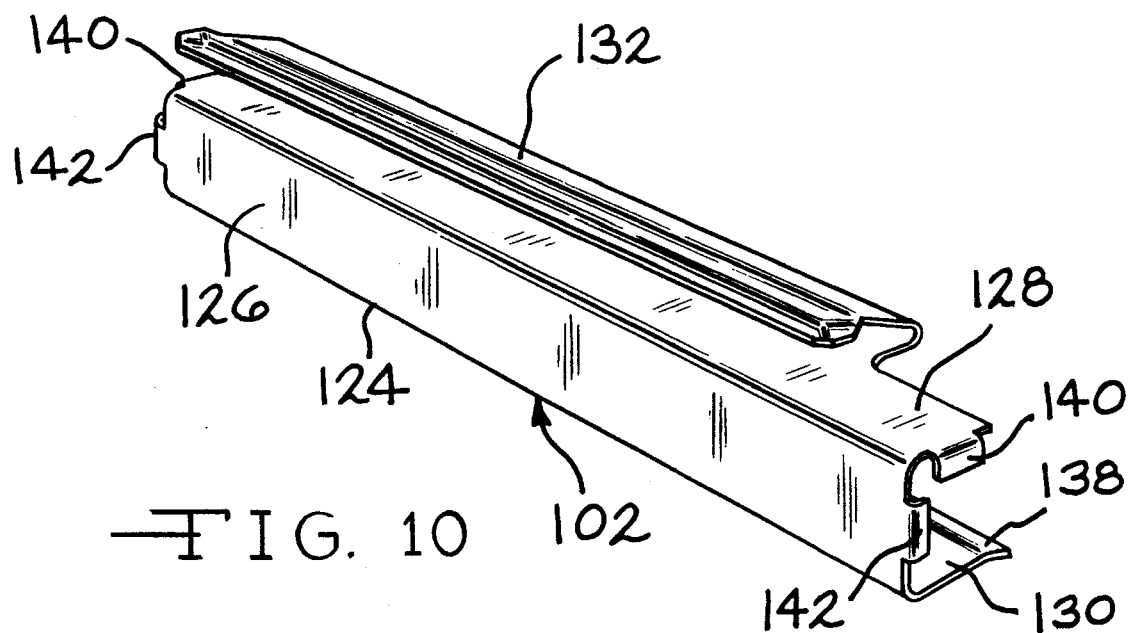
FIG. 10 is a perspective view of another clip of the disc brake assembly.

As best shown in FIG. 10, the clip 102 includes a generally U-shaped main body portion 124 which defines a side wall 126, an upper wall 128, and a lower wall 130. The upper wall 128 includes a reversely bent back spring arm 132 extending therefrom, and the lower wall 130 is provided with a reversely bent back end 138. The clip 102 further includes a pair of tabs 140 extending downwardly from opposed ends of the upper wall 128, and a pair of tabs 142 extending outwardly from opposed ends of the side wall 126. As will be discussed, the tabs 140 and 142 and the bent back end 138 of the lower wall 130 function to positively secure the clip 102 on the guide rail 48 of the anchor plate 40.

The caliper 12 includes a pair of lift stops or arms 150 and 152 provided on a side 154 of the bridge portion 18, best shown in FIG. 2, and a single lift stop or arm 156 provided on an opposite side 158 thereof, best shown in FIG. 4. Preferably, the lift stops 150, 152, and 156 are formed during the casting of the caliper 12 and are subsequently machined to predetermined specifications.

The assembly of the disc brake assembly 10 of the present invention will now be discussed. First, the annular seals 28, the pistons 22, and the dust boot seals 26 are installed in the bores 24 of the caliper 12. The clip 100 is then installed on the guide rail 46, and the clip 102 is installed on the guide rail 48. Next, the friction pads 50 and 52 are installed on the clips 100 and 102.

In this stage of assembly, the spring arms 112 and 116 of the clip 100 retain and function to bias ends 160 and 162 of backing plates 54 and 58, respectively, downwardly toward the guide rail 46 of the anchor plate 40. Also, the spring arm 132 of the clip 102 retains and functions to bias ends 164 and 166 of backing plates 54 and 58, respectively, downwardly toward the guide rail 48 of the anchor plate 40.

Figures 6, 7, 8:
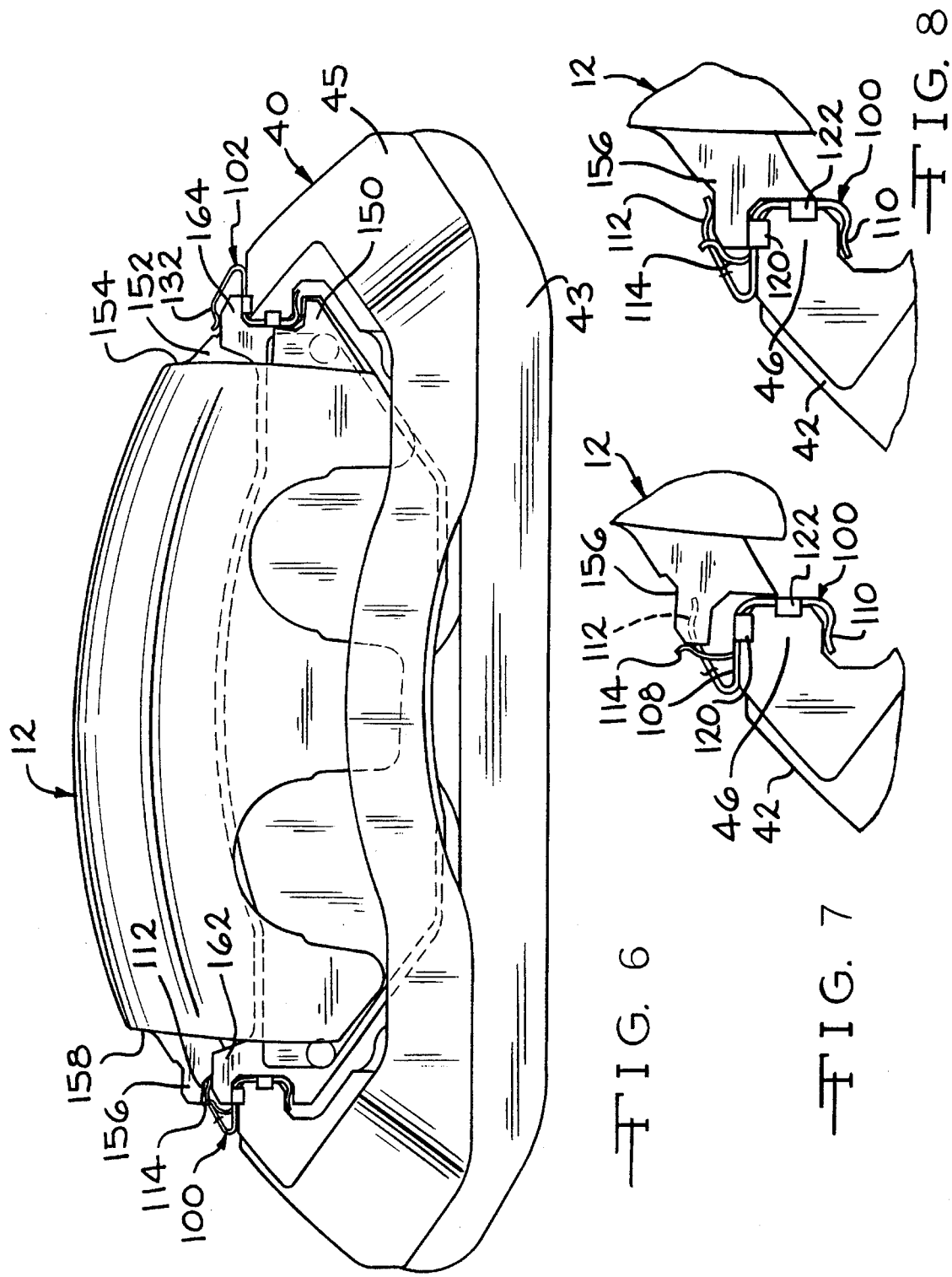
FIG. 6 is a view similar to FIG. 5 showing the initial installation of the caliper assembly.
FIG. 7 is a partial side view of a portion of the disc brake assembly showing the further installation of the caliper assembly.
FIG. 8 is a view similar to FIG. 7 showing the caliper assembly in its fully installed position.

Following this, the caliper 12 is then installed by angling the side 154 of the bridge portion 18 downwardly and positioning the lift stop 150 under the lower wall 130 of the clip 102, as shown in FIG. 1, and the lift stop 152 between the upper wall 128 and the spring arm 132 of the clip 102, as shown in FIG. 6. Next, the other side 158 of the caliper 12 is moved downwardly toward the clip 100 until the lift stop 156 rests atop the spring arm 114 of the clip 100, as shown in FIG. 6. Then, as the side 158 of the caliper 12 is further forced downwardly, the lift stop 156 of the caliper 12 is effective to bias the spring arm 114 of the clip 100 open as shown in FIG. 7.

The side 158 of the caliper 12 is further moved downwardly and the arm 114 of the clip 100 springs back to its normal condition as shown in FIG. 8. As a result, the lift stop 156 of the caliper 12 is retained by the clip 100 and is biased downwardly toward the guide rail 46. The pins 13 are then installed through apertures formed in the inboard leg 16 of the caliper 12 and are received in threaded apertures provided in anchor plate 40 to complete the assembly of the disc brake assembly 10.

While the present invention has been illustrated and described as including both clips 100 and 102, only one of the clips can be installed on one of the guide rails of the caliper. Also, the clips 100 and 102 can include only a spring arm for retaining the associated lift stop of the caliper.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A caliper assembly for a disc brake assembly comprising:
   an anchor plate including first and second guide rails;
   a clip including a main body portion mounted on said first guide rail, said clip having a spring arm formed thereon;
   a first friction pad supported on said first and second guide rails for sliding movement relative to said anchor plate;
   a second friction pad supported on said first and second guide rails for sliding movement relative to said anchor plate;
   a caliper supported for sliding movement relative to said anchor plate, said caliper including an inboard leg and an outboard leg connected together by a bridge portion, said bridge portion of said caliper defining a side which is located adjacent to said first guide rail and which has a stop provided thereon, said spring arm of said clip engaging both said first friction pad and said stop of said caliper to bias both said first friction pad and said caliper in the same direction into engagement with said anchor plate.

2. The caliper assembly defined in claim 1 wherein said clip includes a first spring arm and a second spring arm, said first spring arm engaging said first friction pad and said second spring arm engaging said stop of said caliper.

3. The caliper assembly defined in claim 2 wherein said clip further includes a third spring arm for engaging said second friction pad to bias said second friction pad in said same direction into engagement with said anchor plate.

4. The caliper assembly defined in claim 1 wherein said clip includes a single spring arm which engages both said first friction pad and said stop of said caliper.

5. The caliper assembly defined in claim 1 wherein said clip includes a single spring arm which engages said first friction pad, said second friction pad, and said stop of said caliper to bias said first friction pad, said second friction pad, and said caliper in said same direction into engagement with said anchor plate.

6. The caliper assembly defined in claim 1 wherein said clip includes a generally U-shaped main body portion which defines a clip side wall, a clip upper wall, and a clip lower wall, said clip lower wall including a reversely bent back end.

7. The caliper assembly defined in claim 1 wherein said clip includes a pair of tabs located on opposed ends of said main body portion.

8. The caliper assembly defined in claim 7 wherein said clip includes a generally U-shaped main body portion which defines a clip side wall, a clip upper wall, and a clip lower wall, said tabs defining a first pair of tabs located at opposed ends of said side wall and said clip further including a second pair of tabs located at opposed ends of said upper wall.

9. The caliper assembly defined in claim 1 wherein said clip includes a generally U-shaped main body portion which defines a clip side wall, a clip upper wall, and a clip lower wall, and said first brake shoe is supported on said clip upper wall.

10. The caliper assembly defined in claim 1 further wherein said clip is a first clip and further including a second clip including a main body portion mounted on said second guide rail, said second clip having a spring arm formed thereon, said spring arm of said second clip engaging said first brake shoe to bias said first brake shoe in said same direction into engagement with said anchor plate.

11. The caliper assembly defined in claim 1 further wherein said stop is a first stop, said clip is a first clip, and further including a second clip including a main body portion mounted on said second guide rail, said second clip having a spring arm formed thereon, said bridge portion of said caliper defining an opposite side which is located adjacent said second guide rail and which has a second stop provided thereon, said spring arm of said second clip engaging said second stop to bias said caliper in said same direction into engagement with said anchor plate.

12. The caliper assembly defined in claim 11 wherein said spring arm of said second clip engages both said first friction pad and said second stop.

13. The caliper assembly defined in claim 1 wherein said clip is a first clip and further including a second clip including a main body portion mounted on said second guide rail, said second clip having a spring arm formed thereon, said stop is a first stop and said bridge portion of said caliper defining an opposite side which is located adjacent said second guide rail and which has a second stop provided thereon, said spring arm of said second clip engaging said second stop to bias said caliper in said same direction into engagement with said anchor plate.

14. The caliper assembly defined in claim 13 wherein said second stop is located above said second guide rail.

15. The caliper assembly defined in claim 1 wherein said stop is a first stop located above said first guide rail and said bridge portion of said caliper further defining an opposite side having a second stop provided thereon.

16. The caliper assembly defined in claim 15 wherein said caliper further includes a third stop provided on said opposite side of said bridge portion, said third stop being located below said second guide rail.

17. A disc brake caliper assembly comprising:
   a rotor;
   an anchor plate including first and second guide rails;
   a clip including a main body portion mounted on said first guide rail, said clip having a spring arm formed thereon;
   a pair of friction pads supported on said first and second guide rails for sliding movement relative to said anchor plate; said pair of friction pads disposed on opposite sides of said rotor;
   a caliper supported for sliding movement relative to said anchor plate, said caliper including an inboard leg and an outboard leg connected together by a bridge portion, said bridge portion of said caliper defining a side which is located adjacent to said first guide rail and which has a stop provided thereon, said spring arm of said clip engaging both said first friction pad and said stop of said caliper to bias both said first friction pad and said caliper in the same direction into engagement with said anchor plate; and
   an actuator for selectively moving said friction pads between a non-braking position, wherein said friction pads are spaced apart from said rotor, and a braking position, wherein said friction pads frictionally engage said rotor.

18. An anti-rattle clip for use with a caliper assembly comprising:
   a generally U-shaped main body portion which defines a side wall, an upper wall, and a lower wall, said upper wall including three spring arms extending therefrom, said three spring arms defining a pair of opposed end spring arms and an intermediate spring arm located between said pair of opposed end spring arms, said pair of opposed end spring arms being reversely bent back and extending toward said side wall, and said intermediate spring arm extending generally upwardly from said upper wall.

19. The anti-rattle clip defined in claim 18 wherein said lower wall includes a reversely bent back end.

20. The anti-rattle clip defined in claim 18 wherein said clip further includes a first pair of tabs extending downwardly from opposed ends of said upper wall, and a second pair of tabs extending outwardly from opposed ends of said side wall.

* * * * *